United States Patent [19]

DeCamp

[11] 4,181,157
[45] Jan. 1, 1980

[54] FIRE SLEEVING

[75] Inventor: Douglas A. DeCamp, Hastings, Mich.

[73] Assignee: Flexfab, Inc., Hastings, Mich.

[21] Appl. No.: 866,547

[22] Filed: Jan. 3, 1978

[51] Int. Cl.² ............................................. F16L 11/12
[52] U.S. Cl. .................................. 138/126; 138/128; 138/146; 138/170
[58] Field of Search ............... 138/126, 145, 146, 128, 138/170, 149; 428/921, 920, 170

[56] References Cited

U.S. PATENT DOCUMENTS

| 649,469 | 5/1900 | McConnell | 138/128 |
|---|---|---|---|
| 651,425 | 6/1900 | McConnell | 138/151 |
| 1,435,311 | 11/1922 | Knight | 138/128 |
| 2,445,883 | 7/1948 | Katz et al. | 138/128 |
| 2,906,638 | 9/1959 | Herman | 138/126 |
| 2,984,262 | 5/1961 | Ayami et al. | 138/126 |
| 3,206,183 | 9/1965 | Marwick | 138/145 |
| 3,279,503 | 10/1966 | Carbone et al. | 138/128 |
| 3,885,593 | 5/1975 | Koerber et al. | 138/128 |
| 3,911,961 | 10/1975 | Peyton et al. | 138/170 |
| 3,929,167 | 12/1975 | Bickel | 138/151 |
| 4,018,983 | 4/1977 | Pedlow | 428/921 |
| 4,033,474 | 7/1977 | Rentmeester | 138/170 |

OTHER PUBLICATIONS

Titeflex Total Hose Technology, Catalog 124.

Primary Examiner—Lenard A. Footland
Attorney, Agent, or Firm—Price, Heneveld, Huizenga & Cooper

[57] ABSTRACT

An article of protecting high pressure hydraulic lines, fuel lines and the like is disclosed. The article includes a silicone polymer coated and impregnated glass fiber woven sheet. The sheet is self-coiling and normally assumes the configuration of a coiled, generally cylindrical sleeve. The woven glass fiber sheet is cut along a full bias so as to increase the flexibility of the normally coiled sheet when installed on the line to permit the sleeve and protected line to assume curved configurations without buckling or separation of the sleeve. The sheet is uncoiled and snapped around the high pressure line and a high temperature silicone adhesive seals an elongated, longitudinal seam defined by the overlap of the lateral edges of the sheet.

10 Claims, 6 Drawing Figures

U.S. Patent  Jan. 1, 1980  4,181,157
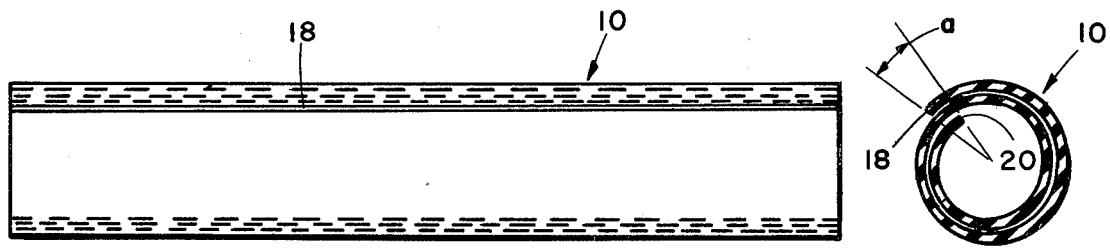
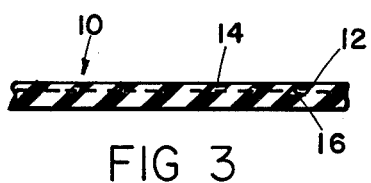
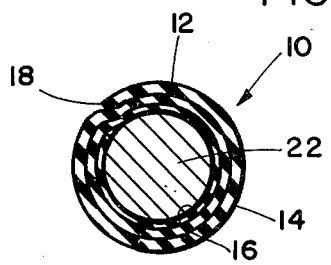
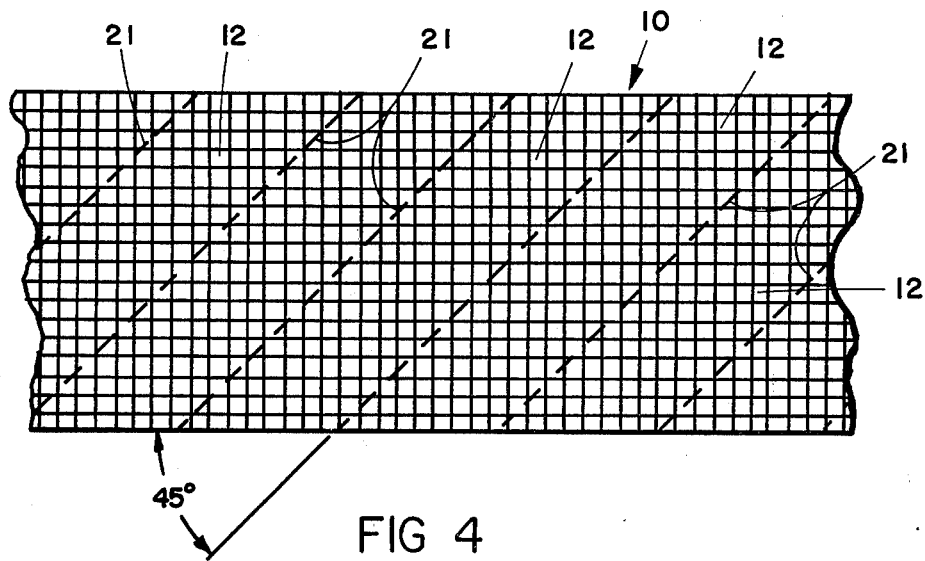
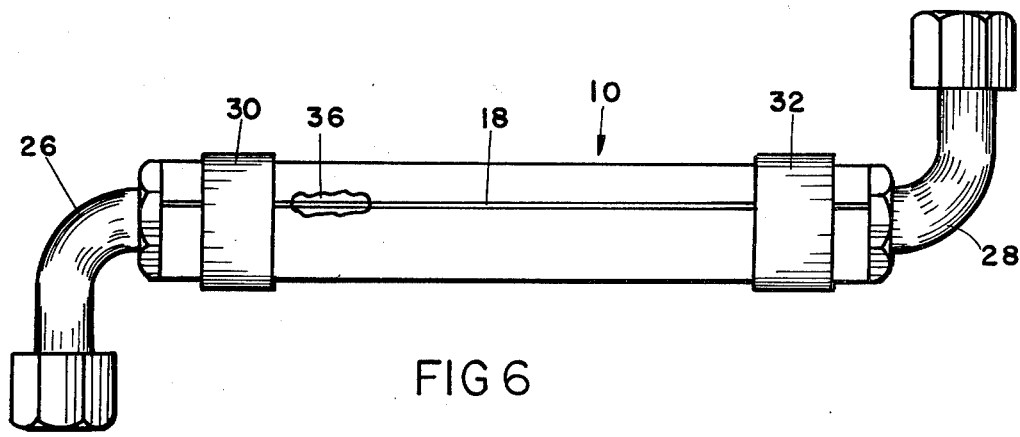

FIRE SLEEVING

BACKGROUND OF THE INVENTION

The present invention relates to an article, a method for making same, and a method for protecting hydraulic lines, fuel lines and the like such as are typically found in aircraft engine applications, from extreme temperatures and flame impingement.

Flexible or bendable hydraulic hose lines and fuel hose lines are used in a wide variety of environments where they may be subjected to extreme temperatures in normal use and/or to flame impingement in an emergency situation. Also, in normal use the lines are exposed to dirt, water, hydraulic oil and fuel. In certain applications, such as in aircraft engines, the hydraulic fluid lines and the fuel lines must be protected for a sufficient period of time in the event of a fire to provide a response time for fire extinguishing equipment. In order to prevent rupture of these high pressure lines or delay rupture for a predetermined period, the lines are typically insulated with fire sleeving. The fire sleeving protecting such lines should be capable of preventing line rupture when exposed to flame and temperatures of up to 2000° F. for a period of 15 minutes.

Heretofore original equipment hydraulic and fuel lines have been typically provided with a fire sleeve including a braided asbestos material tubular core and a silicone rubber cover or coating. This type of original equipment sleeve is slipped over the line prior to installation of the line fittings. The original equipment sleeve cannot be replaced without removal of the fittings. In removing crimp type fittings, the hose is destroyed and the entire assembly must be replaced. Replacement therefore becomes costly and time consuming. The replacement procedure must be performed on a not infrequent basis since the sleeves wear out and replacement is required within approximately two years. In any event, replacement is required at time of a major engine overhaul.

In an attempt to alleviate some of the problems associated with replacement of the aforementioned type of original equipment fire sleeving, a spiral wrap sleeve has been proposed. This type of sleeve is defined by a three-ply, elongated, spiraled strip of silicone rubber coated asbestos. The strip is wrapped around the line in a spiral, overlaping manner. The resulting sleeve and hydraulic line combination has limited flexibility. The elongated seam defined by the spiral strip tends to separate or buckle upon bending of the combination to various curvatures. Also, the elongated, spiral seam which runs around the line and extends the length thereof, permits fuel, dirt and hydraulic fluid contaminants to enter the sleeve between the spirals. In a fire situation, the contaminants may support combustion and therefore reduce the protection capabilities of the sleeving. The spiral wrap sleeve, therefore, may not adequately protect the hydraulic or fuel line.

SUMMARY OF THE INVENTION

A need therefore exists for a fire sleeve for protecting high pressure hydraulic and fuel lines and the like from temperature extremes which is easily and readily installed on such a line at the point of manufacture, in the field or as a replacement item without necessitating removal of the line fittings, provides a flexible sleeve and line combination, eliminates ingress of dirt, fuel or oil and is resistant to flame, dirt, oil, water, fuel, ozone and fungus. Essentially, the sleeving in accordance with the present invention includes a silicone polymer coated glass fiber sheet which is self coiling and normally assumes a coiled, generally cylindrical configuration.

In narrower aspects of the invention, the sheet is a woven glass fiber sheet cut along a full bias to provide increased flexibility of the sleeving and line combination than has heretofore resulted. The normally coiled configuration of the sleeving has at least a two-ply thickness, the lateral edges overlap and the sheet is physically and chemically stable for use in an environment having a temperature range of $-100°$ F. to $600°$ F. The silicone polymer coating on the outside of the sleeve is of a fire retardant composition and of a thickness and composition different from that on the inside inner surface of the sleeve.

The method comtemplated by the present invention includes the steps of uncoiling a resiliant, generally cylindrical normally coiled silicone polymer coated and impregnated glass fiber sheet, placing the uncoiled sheet along the hydraulic or fuel line and letting the sheet snap back to its normally coiled shape so that the lateral edges thereof overlap to define a fire sleeve having a longitudinal seam, and applying a high temperature sealant along the longitudinal seam of the sleeve.

The method fabricating the fire sleeve involves coating a fibrous glass sheet on both sides with silicone polymer, wrapping the sheet on a mandrel, precurring the sheet, and subjecting the sleeve to a post cure treatment to drive flame supporting volatiles from the sleeve.

BRIEF DESCRIPTION OF THE DRAWING

FIG. 1 is a side elevational view of a fire sleeve in accordance with the present invention;

FIG. 2 is an end elevational view of the fire sleeve of FIG. 1;

FIG. 3 is a fragmentary, side elevational view of a portion of the fire sleeving;

FIG. 4 is a top, plane view showing the manner in which the sheet defining the fire sleeving is cut along a 45° bias;

FIG. 5 is an end, elevational view of mandrel upon which the sheet has been wrapped during the manufacturing process; and FIG. 6 is a plan view of a hose and fire sleeve combination in accordance with the present invention.

DETAILED DESCRIPTION OF THE PREFERRED EMBODIMENT

The preferred embodiment of the unique fire sleeve in accordance with the present invention is illustrated in FIGS. 1, 2 and 3 and generally designated 10. Fire sleeving 10 includes a woven glass fiber sheet 12 having a fire retardant silicone polymer coating 14 on its upper surface and a high temperature silicone polymer coating 16 on its lower surface. The fire sleeving 10 is resilient and assumes a normally coiled, generally cylindrical configuration with the lateral edges 18, 20 overlapping through an arc angle generally designated "a" in FIG. 2. As explained below, the glass fiber sheet 12 is "laid up" on a full 45° bias resulting in an increase in the flexibility of the fire sleeve and hose combination.

In a presently existing embodiment of the fire sleeving in accordance with the present invention, the coating 14 is a fire retardant silicone rubber. The presently preferred material for the coating 14 is Dow Corning Silastic S2365 silicone rubber. This rubber has a red color, a specific gravity of 1.19, a brittle point of −103° F. and a chemical classification ASTM D1418 of VMQ. The rubber is prepared with a 2,4-dichlorobenzoyl peroxide (Cadox TS-50 or Luperkco CST) type vulcanizing agent. A fully catalyzed vulcanizing agent level is employed. Based upon a 0.075 inch thick slab, press molded 5 minutes at 116° Centigrade (240° F.) and post-cured for one hour at 200° Centigrade (392° F.), this type of silicone rubber has a Shore A Durometer of 40, a tensile strength of 900/psi, an elongation modulus of 700%, a tear strength, Die "B" of 75/ppi, a bond strength (rubber to glass cloth) of 10/ppi and flame resistance characteristics according to Dow Corning test CPM-0451 (reference FED. 191-5903.1) of a 12 second flame time and a char length of 1 inch. The coating 14 is preferably coated onto the glass fiber sheet to a thickness of 8 mil. by a conventional calender process.

The silicone coating 16 also applied by a calender process is preferably Dow Corning Silastic 451OU silicone rubber. This silicone rubber has a light straw color, a specific gravity of 1.19, a brittle point of −73° Centigrade (−100° F.) and a chemical classification ASTM D1418 of VMQ. The rubber is prepared with a 2,4-Dichlorobenzoyl Peroxide (Cadox TS-50 or Lupercko CST) type vulcanizing agent—a fully catalyzed vulcanizing agent level is employed.

Typical properties of silicone rubber 16 based upon a 0.075 inch thick slab press molded 10 minutes at 150° C. (302° F.) include a Shore A Durometer of 54, a tensile strength of 900/psi, an elongation modulus of 300%, a Die "B" tear strength of 55/ppi and a compression set 70 hours at 150° C. (302° F.) of 26%.

Both of the forementioned silicone coatings 14, 16 are readily available commercial items which may be purchased through Dow Corning Corporation, Midland, Michigan.

It is presently preferred that the glass fiber sheet 12 be a 20×18, plain weave glass (0.016), ECE 225-4/3W & F yarn having a gauge of 0.060+0.005 inches.

As an initial step in the manufacture of the sleeve, coatings 14 and 16 of silicone rubber are calender coated onto the surfaces of a large glass fiber sheet. As seen in FIG. 4, the coated woven sheet may then be cut along lines 21 at a 45° bias or a full bias to form strips which define sheets 12. The ends of the resulting cut strips may be trimmed square. In the alternative, the sheet could be cut prior to coating. The strips or cut sheets 12 are wound on a mandrel 22, as seen in FIG. 5, in an "envelope" fashion to the required number of plies (3 shown). The thicker coating 16 is wrapped against the mandrel. Prior to wrapping, both surfaces of the coated strip are sprayed with a McLube and teflon spray. A piece of one half inch wide cellophane is placed under the outer seam defined by the lateral edge 18 to prevent bonding of the seam to the sheet. A cellophane wrap is applied for pre-cure and the mandrel and sheet are placed in an oven and pre-cured for 15 minutes at 350° F. Next, the cellophane wrap is removed and the partially cured or pre-cured sleeve is cooled (water bath) and removed from the mandrel. The cellophane is removed from under the overlapped seam area 18 and the sleeve is uncoiled. The sleeve surfaces are then dusted with a Mica dust. Finally, the sleeve is subjected to a two-step post-cure. First, the sleeve is post-cured for a total period of 12 hours with a temperature starting at 150° F. and raising to 480° F. at which it is held for 5 hours. The sleeve is then post-cured at 550° F. for a period of 15 minutes. This two-step post-cure insures that all of the flame supporting volatiles in the silicone rubber coatings 14, 16 are driven from the sleeve.

The resulting fire sleeving manufactured in accordance with this procedure from the preferred materials will be chemically and physically stable within acceptable service limits for use in environments experiencing a temperature range of −100° F. to +600° F. The −100° F. temperature represents the brittle point for the fire sleeving. At the upper end of the temperature range, the service life of the sleeve will be shortened since the silicone material may start to dry and deteriorate. The usuable temperature range permits the product to be employed in aircraft structure and engine environments.

The preferred embodiment of the sleeving 10 conforms to Mil-y-1140F, Class C, Form 4 fabric specification and has a ply adhesion of 8 lbs. per inch after a 5 hour 480° F. post-cure based upon a test sample 1 inch wide and a 2 inch/min. peel. The sleeving has an acceptable service flexibility at −75° F. and a minimum acceptable service life of 72 hours with a continuous room ambient temperature of 600° F.

As seen in FIG. 6, the fire sleeving 10 is easily installed upon hoses of the type employed for hydraulic oil and fuel applications by the aircraft industry. The hoses typically are stainless steel wire braid reinforcement over an extruded tube of Teflon with permanently attached, compression end fittings 26, 28. The fire sleeving 10 which is preferably fabricated in standard lengths to fit standard size hoses, is uncoiled and snapped onto the hose and secured thereto with band clamps 30, 32. The sleeving may be notched at the corners so that the ends are generally T-shaped in plan. The sleeving will then fit over the crimped ends of the fittings without bulging. A high temperature silicone adhesive 34, partially shown in FIG. 6, is preferrably applied along the lateral seam defined by the edge 18 of the coiled sleeving 10. The adhesive seals the seam and prevents ingress of oil, water, dirt, fuel and the like. It is presently preferred that a high temperature silicone adhesive of the type manufactured by General Electric Company and distributed under the brand name RTV 106 be employed to seal this lateral seam. The band clamps 30, 32 need not be used and the high temperature RTV 106 silicone may be used to seal the area of the end fittings.

The resulting fire sleeve and hoseline combination in accordance with the preferred embodiment meets the 15 minute, no leakage test requirements of ARP 1055 for Type 2D, Class B-S/P as performed per FAA TSO C-53A. A two-ply sleeve with an arc angle "a" overlap of at least 35°, when subjected to flame impingement at temperatures of approximately 2000° F., protects the hose and prevents leakage. During flame impingement, the silicone coating 14 on the outer surface will "ash". As the coating ashes, it ablates or falls off of the sleeving. The thicker coating 16 and the inner layers of coating 14 will also ash but will be held in place around the hose by the glass fiber sheet 12. The "ashing" increases the insulating characteristics and the sleeving creates a barrier between the flame and the hose. The ashing of the coatings will begin at temperatures of approximately 1200° F. to 1300° F.

Since the sleeve is fabricated from elongated strips of woven glass fiber sheets cut along a 45° bias, the sleeving 11 and hose flexibility is increased from that heretofore provided. The bendable hose may be routed in accordance with environmental needs and the fire sleeving will flex or bend with the hose without buckling or separation of the longitudinal seam.

The fire sleeving is preferably manufactured in a range of sizes to fit standard hose. For example, fire sleeving having a nominal ID of 0.312 for −4 size hose having a nominal ID of 0.187; a nominal ID of 0.386 inch for −5 size hose having a nominal ID of 0.250, a nominal ID of 0.445 inch for −6 size hose having a nominal ID of 0.312; a nominal ID of 0.549 for −8 size hose having a nominal ID of 0.406; a nominal ID of 0.648 for −10 size hose having a nominal ID of 0.500; a nominal ID of 0.778 for −12 size hose having a nominal ID of 0.625; a nominal ID of 1.109 for −16Z size hose having a nominal ID of 0.875; a nominal ID of 1.359 for −20Z size hose having a nominal ID of 1.125; and a nominal ID of 1.672 for −24Z size hose having a nominal ID of 1.375.

As should now be readily apparent to those of ordinary skill in the art, the present invention provides significant advantages over prior sleeving. The fire sleeving in accordance with the present invention will conform to the fire resistance and fire test requirements for fluid system components promulgated by the Society of Automotive Engineers, Aerospace Recommended Practice, ARP 1055 issued Feb. 1, 1969. The fire sleeving is easily installed as a replacement item in the field since the original equipment "slip-on" type sleeve may be removed and the sleeve in accordance with the present invention uncoiled and "snapped on" the existing line. This results in a substantial reduction in the cost of major aircraft engine and structure overhauls. It is no longer necessary to replace the entire hoseline/fire sleeve combination. The fire sleeving is resistant to extreme temperatures and usable within the temperature range of −100° to 600°. The sleeving meets the flame test requirements currently employed in the industry, is resistant to oil, dirt, water, fuel and fungus and is easily manufactured and installed. The coiled configuration presents only a single seam. When sealed as set forth above, ingress of flame supporting materials is prevented. The sleeve will "flex" in use and buckling or separation along the seam is eliminated.

It is expressly intended, however, that the above description should be considered as that of the preferred embodiment. Various modifications will undoubtedly now become apparent to those of ordinary skill in the art in view of the above description. For example, the thickness of the silicone coatings could be increased without affecting the performance of the fire sleeving. Also, the number of plies could be increased. Therefore, the true spirit and scope of the present invention may be determined by reference to the appended claims.

The embodiments of the invention in which an exclusive property or privilege is claimed are defined as follows:

1. An article for insulating tubular hydraulic lines, fuel lines and the like to provide protection from extreme temperatures associated with a fire, said article comprising:

a silicone polymer coated glass fiber sheet, said sheet being self coiling and having a normally coiled generally cylindrical configuration, one surface of said sheet being coated with a flame retardant, flame supporting volatile free silicone rubber having a Shore A Durometer of 40, a tensile strength of 900 psi, an elongation modulus of 700%, a Die B tear strength of 75 ppi and flame resistance characteristics of 12 seconds and a char length of 1 inch based upon a 0.075 inch thick slab, press molded five minutes at 116° C., and the other surface of said sheet being coated with a high temperature, flame supporting volatile free silicone rubber different from said flame retardant silicone rubber and coated to a thickness greater than the thickness of said flame retardant silicone rubber coating, said high temperature silicone rubber having a Shore A of 54, a tensile strength of 900 psi, a Die B tear strength of 55 ppi, an elongation modulus of 300% based upon a 0.075 inch thick slab press molded ten minutes at 150° C., said coatings ashing when exposed to extreme temperatures so that the insulating characteristics of said article increases and a flame barrier is created.

2. An article as defined by claim 1 wherein said sheet is a woven glass fiber sheet cut on a full bias to increase the flexibility of said normally coiled sheet permitting the sheet to assume curved configurations without buckling.

3. An article as defined by claim 2 wherein said sleeve is post-cured at a temperature of up to 480° F. for approximately twelve hours and then post-cured at a temperature of approximately 550° F. for fifteen minutes whereby flame supporting volatiles are driven from said coatings.

4. An article as defined by claim 3 wherein said flame retardant coating has a thickness of approximately eight mil and said coating on said other surface has a thickness of approximately thirty-six mil.

5. An article as defined by claim 2 wherein said sheet in the normally coiled configuration has at least a two-ply thickness.

6. An article as defined by claim 5 wherein the lateral edges of said sheet overlap in the normally coiled configuration.

7. An article as defined by claim 6 wherein said sheet is physically and chemically stable in the temperature range of −100° F. to +600°.

8. An article as defined by claim 6 wherein said sheet has a thickness between 0.050 inch and 0.065 inch.

9. An article as defined by claim 8 wherein the lateral edges of said sheet overlap through an arc segment of approximately 35°.

10. An article as defined by claim 9 wherein said sheet when in an uncoiled, developed configuration is generally rectangular in plan.

* * * * *